(12) United States Patent
Yamaki

(10) Patent No.: US 11,722,362 B2
(45) Date of Patent: Aug. 8, 2023

(54) COMMUNICATION SYSTEM AND COMMUNICATION DEVICE FOR PARTIAL FAILOVER

(71) Applicant: NEC Platforms, Ltd., Kawasaki (JP)

(72) Inventor: Norimitsu Yamaki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 95 days.

(21) Appl. No.: 17/311,758

(22) PCT Filed: Dec. 12, 2019

(86) PCT No.: PCT/JP2019/048786
§ 371 (c)(1),
(2) Date: Jun. 8, 2021

(87) PCT Pub. No.: WO2020/137597
PCT Pub. Date: Jul. 2, 2020

(65) Prior Publication Data
US 2022/0029878 A1 Jan. 27, 2022

(30) Foreign Application Priority Data
Dec. 25, 2018 (JP) ................................ 2018-240552

(51) Int. Cl.
*H04L 41/0668* (2022.01)
*H04L 1/22* (2006.01)

(52) U.S. Cl.
CPC ............ *H04L 41/0668* (2013.01); *H04L 1/22* (2013.01)

(58) Field of Classification Search
None
See application file for complete search history.

(56) References Cited

U.S. PATENT DOCUMENTS

| 11,010,189 B2 * | 5/2021 | Yoshida ............. G06F 9/45558 |
| 2002/0006114 A1 * | 1/2002 | Bjelland ............. H04L 65/1104 |
| | | 370/349 |

(Continued)

FOREIGN PATENT DOCUMENTS

| CN | 103713932 A | 4/2014 |
| JP | 5218626 B2 | 6/2013 |

(Continued)

OTHER PUBLICATIONS

Chinese Office Action for CN Application No. 201980085772.0 dated May 26, 2022 with English Translation.

(Continued)

*Primary Examiner* — Benjamin Lamont

(57) ABSTRACT

A communication system (50) according to the present invention includes a first communication device (10) that functions as a main device, and a second communication device (20) that functions as a backup device for the first communication device (10). A second functional unit of the second communication device (20) transmits a response request to a first functional unit of the first communication device (10), and transmits a transfer-destination switching request to the first communication device (10) if a response to the response request has not been received from the first functional unit. If a first transfer unit receives the transfer-destination switching request from the second functional unit, the first transfer unit switches a transfer destination of packets that should be processed by the second functional unit from the first functional unit to the second functional unit.

8 Claims, 8 Drawing Sheets

(56) References Cited

U.S. PATENT DOCUMENTS

| | | | | |
|---|---|---|---|---|
| 2004/0257982 | A1* | 12/2004 | Boll | H04L 41/0677 |
| | | | | 370/221 |
| 2012/0265359 | A1* | 10/2012 | Das | G06F 13/42 |
| | | | | 700/286 |
| 2015/0186206 | A1* | 7/2015 | Bhattacharya | G06F 11/0793 |
| | | | | 714/3 |
| 2016/0277509 | A1* | 9/2016 | Qiang | H04L 67/51 |
| 2019/0052520 | A1* | 2/2019 | Luo | H04L 41/0816 |
| 2020/0007629 | A1* | 1/2020 | Tse | H04L 67/1008 |
| 2020/0034180 | A1* | 1/2020 | Hoshino | H04L 41/0668 |

FOREIGN PATENT DOCUMENTS

| | | | |
|---|---|---|---|
| JP | 2016208068 | A | 12/2016 |
| WO | 2005/041539 | A2 | 5/2005 |
| WO | 2018180613 | A1 | 10/2018 |

OTHER PUBLICATIONS

European Office Communication for EP Application No. 19902958.8 dated Jan. 4, 2022.

International Search Report of PCT Application No. PCT/JP2019/048786 dated Feb. 4, 2020.

Network Functions Virtualisation ETSI Industry Specification Group, "Network Functions Virtualisation(NFV) Resiliency Requirements_ ETSI GS NFV-REL 001 V1.1.1", Jan. 2015, pp. 55-59.

Horiba et al, "Practice of service chain design and operation using NFV", Journal of Digital Practices of Information Processing Society of Japan, Oct. 2018, pp. 923-944, vol. 9, No. 4, Japan.

* cited by examiner

<TRANSFER-DESTINATION MANAGEMENT TABLE>

| PACKET IDENTIFICATION INFORMATION | FUNCTIONAL-UNIT IDENTIFICATION INFORMATION | TRANSFER-DESTINATION SWITCHING REQUEST | TRANSFER-DESTINATION INFORMATION | |
|---|---|---|---|---|
| | | | IDENTIFICATION INFORMATION OF CPUS OF OWN DEVICE (DEFAULT TRANSFER DESTINATION) | IDENTIFICATION INFORMATION OF OTHER COMMUNICATION DEVICES (TRANSFER DESTINATION AFTER SWITCHING) |
| IDENTIFICATION INFORMATION OF REQUEST FOR IP-TELEPHONE CALLS | function_A | RECEIVED | CPU2 | 192.168.0.xxx |
| IDENTIFICATION INFORMATION OF IP-TELEPHONE AUDIO DATA | function_B | UNRECEIVED | CPU2 | 192.168.0.xxx |
| — | function_C | UNRECEIVED | CPU1 | 192.168.0.xxx |

Fig. 8

COMMUNICATION SYSTEM AND COMMUNICATION DEVICE FOR PARTIAL FAILOVER

This application is a National Stage Entry of PCT/JP2019/048786 filed on Dec. 12, 2019, which claims priority from Japanese Patent Application 2018-240552 filed on Dec. 25, 2018, the contents of all of which are incorporated herein by reference, in their entirety.

TECHNICAL FIELD

The present invention relates to a communication system and a communication device. More specifically, the present invention relates to a communication system and a communication device that enables fault tolerance.

BACKGROUND ART

Hitherto, in IP (Internet Protocol) telephone systems, a communication device having a plurality of functions such as a routing function, a call control function, and an audio-communication control function has been used. Generally, such a communication device includes a single CPU (Central Processing Unit), and this CPU executes a routing process, a call control process, and an audio-communication control process. In this way, the routing function, the call control function, and the audio-communication control function are exerted. However, in case where a failure occurs to the CPU, or in case where a problem occurs to an OS (Operating System) or a functional unit that is implemented by the communication device, terminal devices that use the communication device cannot perform data communication via the communication device.

As a countermeasure against this problem, the IP telephone system disclosed in Patent Literature 1 employs redundancy with use of a plurality of IP telephones. Specifically, an extension control function is assigned to one of IP telephones, and another one of the IP telephones functions, i.e., a backup terminal operates as an extension control terminal in case where a failure occurs to the one of the IP telephone terminals. In this way, even in case where a failure occurs to one of the IP telephone terminals, a function of the audio communication via the IP telephones is continuously provided.

CITATION LIST

Patent Literature

Japanese Patent No. 5218626

SUMMARY OF INVENTION

Technical Problem

However, the IP telephone system disclosed in Patent Literature 1 has a disadvantage that, in case where a problem occurs only to a certain one functional unit of a plurality of functional units of a device, a function of this functional unit cannot be independently exerted by another device.

The present invention has been made in view of the problem as described above, and an object of the present invention is to provide a communication system and a communication device that enable a function of a certain one functional unit of a plurality of functional units of a communication device to be independently exerted by another communication device in case where a problem occurs only to the certain one functional unit.

Solution to Problem

According to the present invention, there is provided a communication system including:

a first communication device that includes a first functional unit and a first transfer unit, and that functions as a main device; and a second communication device that includes a second functional unit and a second transfer unit, and that functions as a backup device for the first communication device.

The second functional unit includes a monitoring unit configured to transmit a response request to the first functional unit, and configured to determine whether or not a response to the response request has been received from the first functional unit, and a switching request unit configured to transmit, to the first communication device, a transfer-destination switching request for transferring packets that should be processed by the second functional unit to the second functional unit if the response has not been received from the first functional unit.

The first functional unit includes a response unit configured to determine whether or not the response request has been received from the second functional unit, and configured to transmit the response to the second functional unit if the response request has been received from the second functional unit.

The first transfer unit includes a transfer-destination switching unit configured to switch a transfer destination of the packets that should be processed by the second functional unit from the first functional unit to the second functional unit if the transfer-destination switching request has been received from the second functional unit.

Advantageous Effects of Invention

According to the present invention, it is possible to provide the communication system and the communication device that enable a function of a certain one functional unit of a plurality of functional units of a communication device to be independently exerted by another communication device in case where a problem occurs only to the certain one functional unit.

BRIEF DESCRIPTION OF DRAWINGS

FIG. 8 is a table showing an example of a transfer-destination management table.

DESCRIPTION OF EMBODIMENTS

Figure 1:
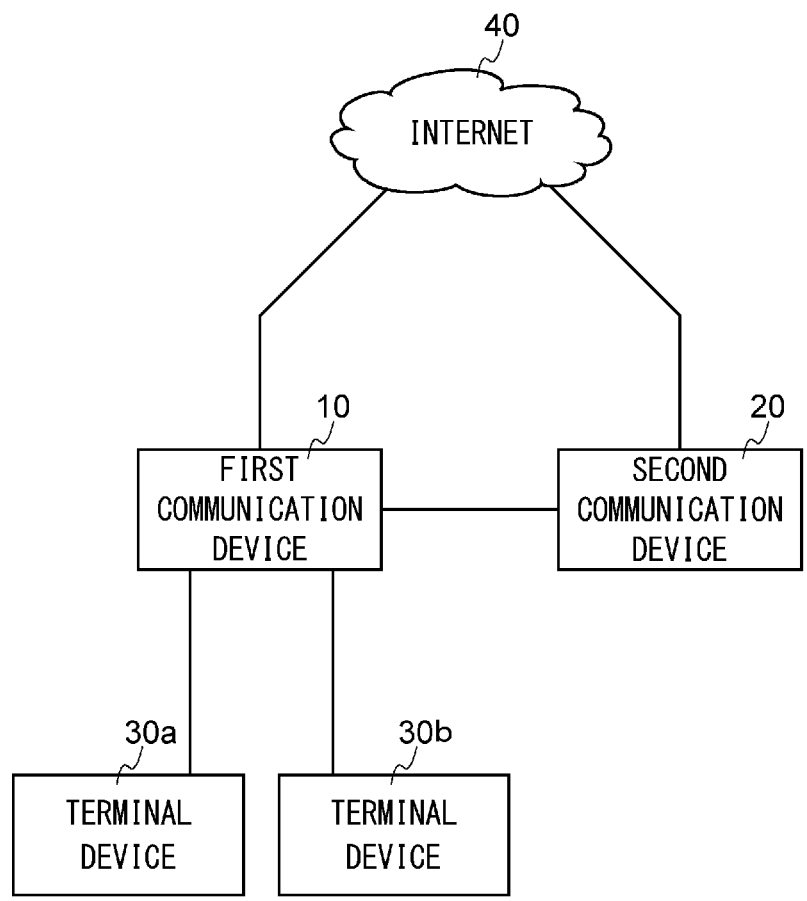
FIG. 1 is a schematic diagram showing a communication system according to an example embodiment of the present invention.

An example embodiment of the present invention is described hereinafter with reference to the drawings. FIG. 1 is a schematic diagram showing a communication system 50 according to the example embodiment of the present invention. The communication system 50 includes a first communication device 10, a second communication device 20, and terminal devices 30a and 30b. Specific examples of the first communication device 10 and the second communication device 20 include a router that functions as an access point. The first communication device 10 and the second communication device 20 are able to perform data communication with each other through a communication cable. In addition, the first communication device 10 and the second communication device 20 are connected to a WAN (Wide Area Network) such as the Internet 40 so that data communication with an external device can be performed. The first communication device 10 and the terminal devices 30a and 30b are able to perform data communication with each other through communication cables or via a wireless LAN. The first communication device 10 and the second communication device 20 are able to implement a VRRP (Virtual Router Redundancy Protocol). This enables the terminal devices 30a and 30b to recognize these communication devices theoretically as a single communication device. Note that, although only the two terminal devices 30a and 30b are connected to the first communication device 10 in FIG. 1, a single communication device or three or more communication devices may be connected thereto. In addition, the first communication device 10 and the second communication device 20 may perform the data communication with each other via a wireless LAN.

Figure 2:
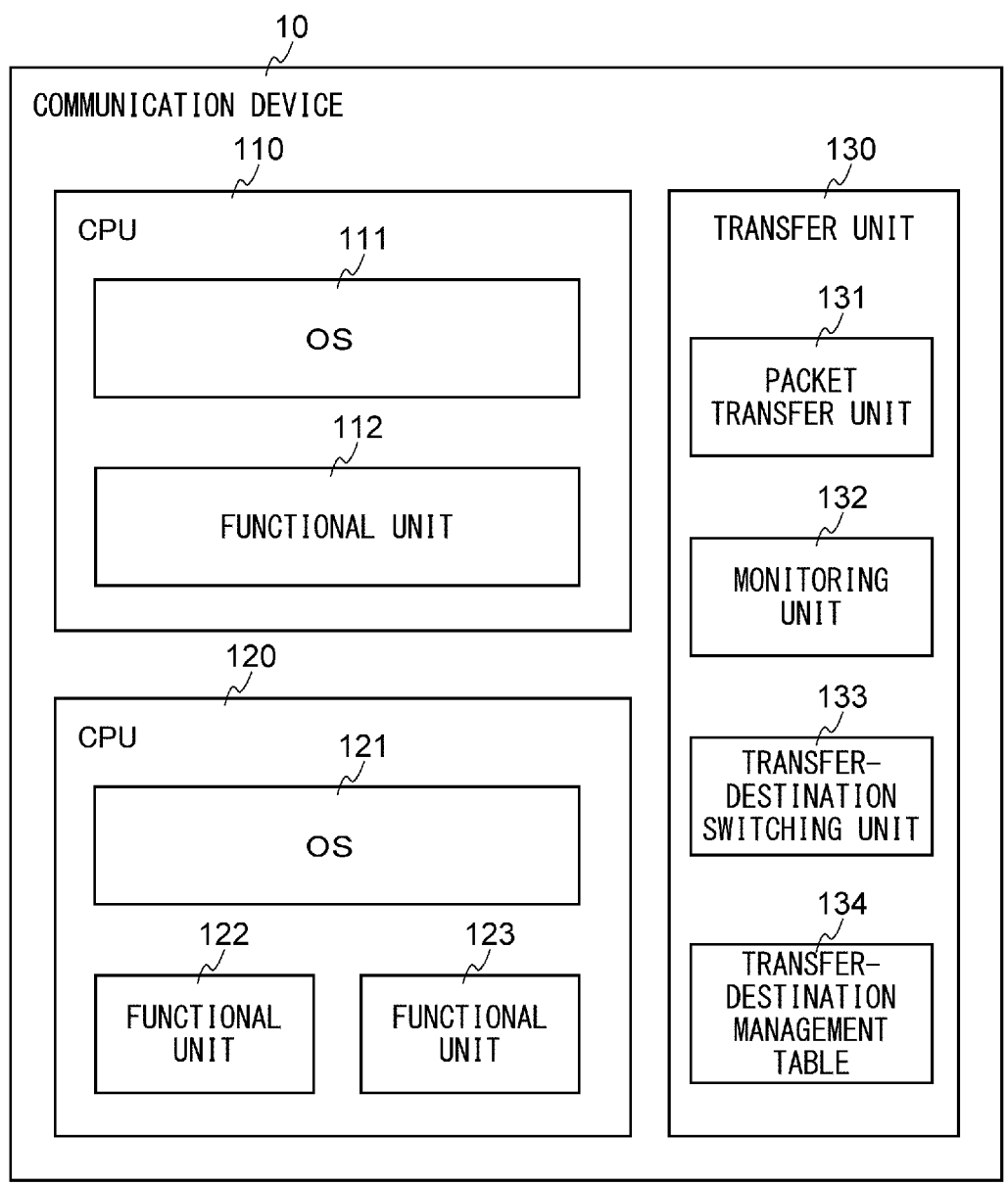
FIG. 2 is a block diagram showing a detailed configuration of a communication device according to the example embodiment of the present invention.

FIG. 2 is a block diagram showing a detailed configuration of the first communication device 10 according to the example embodiment of the present invention. With regard to the following description of the configuration of the first communication device 10, the second communication device 20 has the same configuration as that of the first communication device 10. The first communication device 10 includes a CPU 110, a CPU 120, and a transfer unit 130.

The CPU 110, which is a computing device that performs various computations, implements an OS 111 and a functional unit 112. The OS 111 is a program for controlling the functional unit 112 that is implemented on the CPU 110. The functional unit 112 is another program for exerting one of functions of the first communication device 10, specifically, routes packets which are received from the external device.

The CPU 120, which is another computing device that performs various computations, implements an OS 121 and functional units 122 and 123. The OS 121 is a program for controlling the functional units 122 and 123 that are implemented on the CPU 120. The functional unit 122 is another program for exerting another one of the functions of the first communication device 10, specifically, controls IP-telephone calls. The functional unit 123 is a still another program for exerting a still another one of the functions of the first communication device 10, specifically, controls IP-telephone audio communication.

The transfer unit 130 is a semiconductor integrated device that processes the packets which are received from the external device. The transfer unit 130 includes a packet transfer unit 131, a monitoring unit 132, a transfer-destination switching unit 133, and a transfer-destination management table 134.

The packet transfer unit 131 is a logic circuit that transfers the packets which are received from the external device. Specific examples of the packet transfer unit 131 includes an L2 switch. FIG. 8 is a table showing an example of the transfer-destination management table 134. Packet identification information, functional-unit identification information, information which indicates whether or not a transfer-destination switching request has been made, and transfer-destination information are registered with the transfer-destination management table shown in FIG. 8. The packet identification information is information for identifying the packets. Examples of the packet identification information to be registered include identification information that is unique to packets regarding the control of the IP-telephone calls, and identification information that is unique to packets regarding audio communication after establishment of connection to the IP telephone.

The functional-unit identification information is identification information of the functional units of the first communication device 10 and the second communication device 20. In the example shown in FIG. 8, the functional unit indicated by functional-unit identification information (function_a) is a functional unit that controls the IP-telephone calls, and the functional unit indicated by functional-unit identification information (function_b) is a functional unit that controls the IP-telephone audio communication. In addition, the functional unit indicated by functional-unit identification information (function_c) is a functional unit that routes data other than IP-telephone data. Note that the first communication device 10 and the second communication device 20 commonly use the functional-unit identification information.

The information which indicates whether or not the transfer-destination switching request has been made is information which indicates whether or not the transfer-destination switching request has been received from another one of the communication devices. Information which indicates that the transfer-destination switching request has not been received is registered by default. The transfer-destination information is identification information of transfer destinations of the packets. As the transfer-destination information, identification information of the CPUs of an own device, and identification information (IP address) of the other one of the communication devices are used.

The packet transfer unit 131 acquires the packet identification information from the packets which are received from the external device. Then, the packet transfer unit 131 refers to the transfer-destination management table 134, and specifies, out of the information items which indicate whether or not the transfer-destination switching request has been made, an information item that is associated with the packet identification information. Note that, if this packet identification information has not been registered with the transfer-destination management table 134, the packet transfer unit 131 specifies, out of the information items which indicate whether or not the transfer-destination switching request has been made, an information item that is associated with unregistered identification information (function_C in the example shown in FIG. 8). If the information which indicates that the transfer-destination switching request has not been received is registered, that is, if the transfer-destination switching request has not been received from the other one of the communication devices, the packet transfer unit 131 specifies identification information of one of the CPUs of the own device, i.e., a default transfer destination, and then transfers the packets to the one of the CPUs. Meanwhile, if information which indicates that the transfer-destination switching request has been received is registered, that is, if the transfer-destination switching request has been received from the other one of the communication devices, the packet transfer unit 131 specifies the IP address of the other one of the communication devices, i.e., a transfer destination after switching, and then transfers the packets to the other one of the communication devices.

The monitoring unit 132 is a logic circuit that determines whether or not the transfer-destination switching request has been received from the other one of the communication devices. The transfer-destination switching unit 133 is a logic circuit that switches, if the transfer-destination switching request is received from the other one of the communication devices, the transfer destination of packets that should be processed by a functional unit of a transmission origin of the transfer-destination switching request from a functional unit of the own device to the functional unit of the transmission origin of the transfer-destination switching request. Specifically, if the monitoring unit 132 determines that the transfer-destination switching request has been received from the other one of the communication devices, the transfer-destination switching unit 133 registers information which indicates that the transfer-destination switching request has been made with the transfer-destination management table 134 on the basis of identification information of the functional unit of the transmission origin of the transfer-destination switching request, the identification information being included in the transfer-destination switching request.

Figure 3:
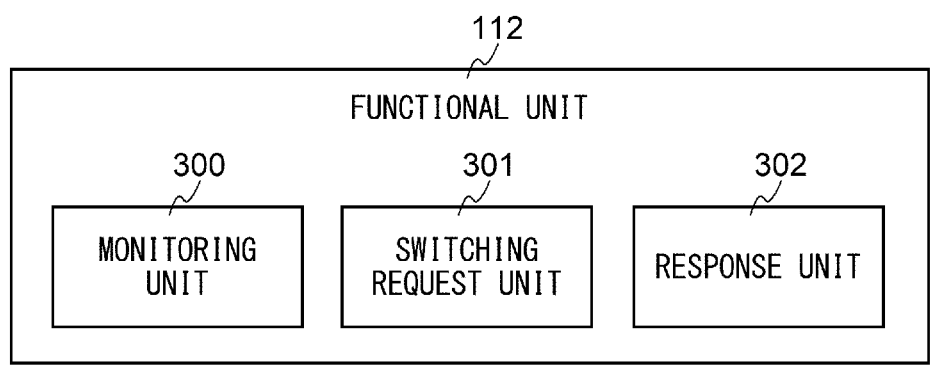
FIG. 3 is a block diagram showing a detailed configuration of a functional unit of the communication device according to the example embodiment of the present invention.

FIG. 3 is a block diagram showing a program module of each of the functional units of the first communication device 10 and the second communication device 20. The program module, which is described hereinafter, is that of the functional unit 112 of the first communication device 10. Each of the other functional units of the first communication device 10 and the functional units of the second communication device 20 has the same program module as that of the functional unit 112 of the first communication device 10.

The functional unit 112 includes a monitoring unit 300, a switching request unit 301, and a response unit 302. The monitoring unit 300 and the switching request unit 301 are implemented when the own device functions as a backup device, and the response unit 302 is implemented when the own device functions as a main device.

The monitoring unit 300 is a program module that transmits a response request to a corresponding one of the functional units of the main device, the corresponding one corresponding to the functional unit 112 of the backup device, and that determines whether or not a response to the response request has been received from the corresponding one of the functional units of the main device.

The switching request unit 301 is a program module that transmits, to the main device, the transfer-destination switching request for transferring the packets that should be processed by the functional unit 112 of the backup device to this functional unit 112 if the response to the response request has not been received from the corresponding one of the functional units of the main device, the corresponding one corresponding to the functional unit 112 of the backup device.

The response unit 302 is a program module that determines whether or not the response request has been received from the backup device, and that transmits the response to the response request to the backup device if the response request has been received.

Figure 4:
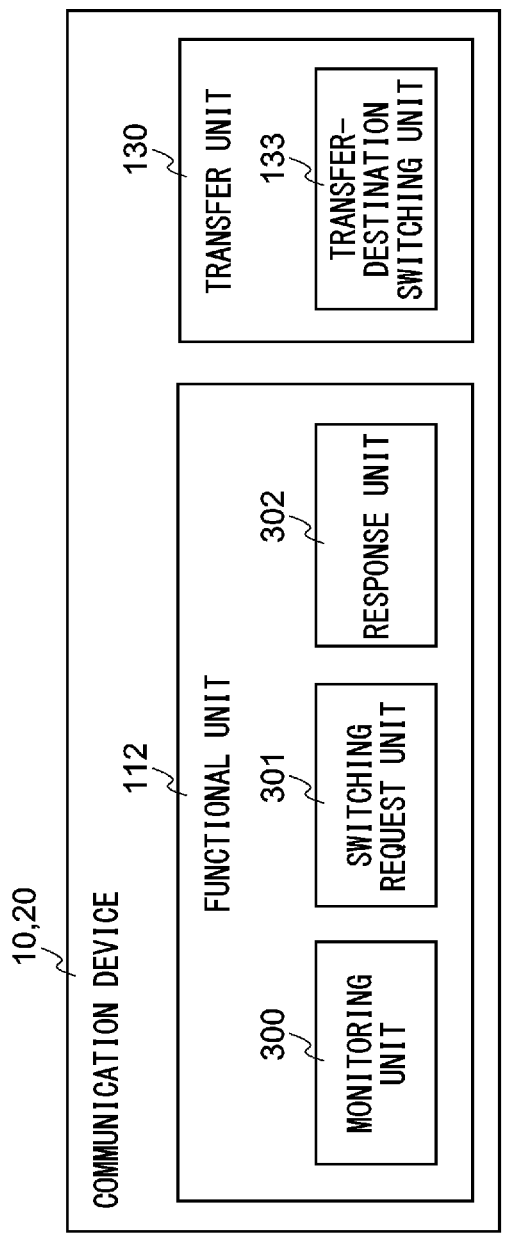
FIG. 4 is a block diagram showing a schematic configuration of each of the communication devices according to the example embodiment of the present invention.

FIG. 4 is a block diagram showing main components of each of the communication devices according to the example embodiment of the present invention. Each of the first communication device 10 and the second communication device 20 includes the functional unit 112 and the transfer unit 130 as its main components. The functional unit 112 includes the monitoring unit 300, the switching request unit 301, and the response unit 302. The transfer unit 130 includes the transfer-destination switching unit 133.

Figure 5:
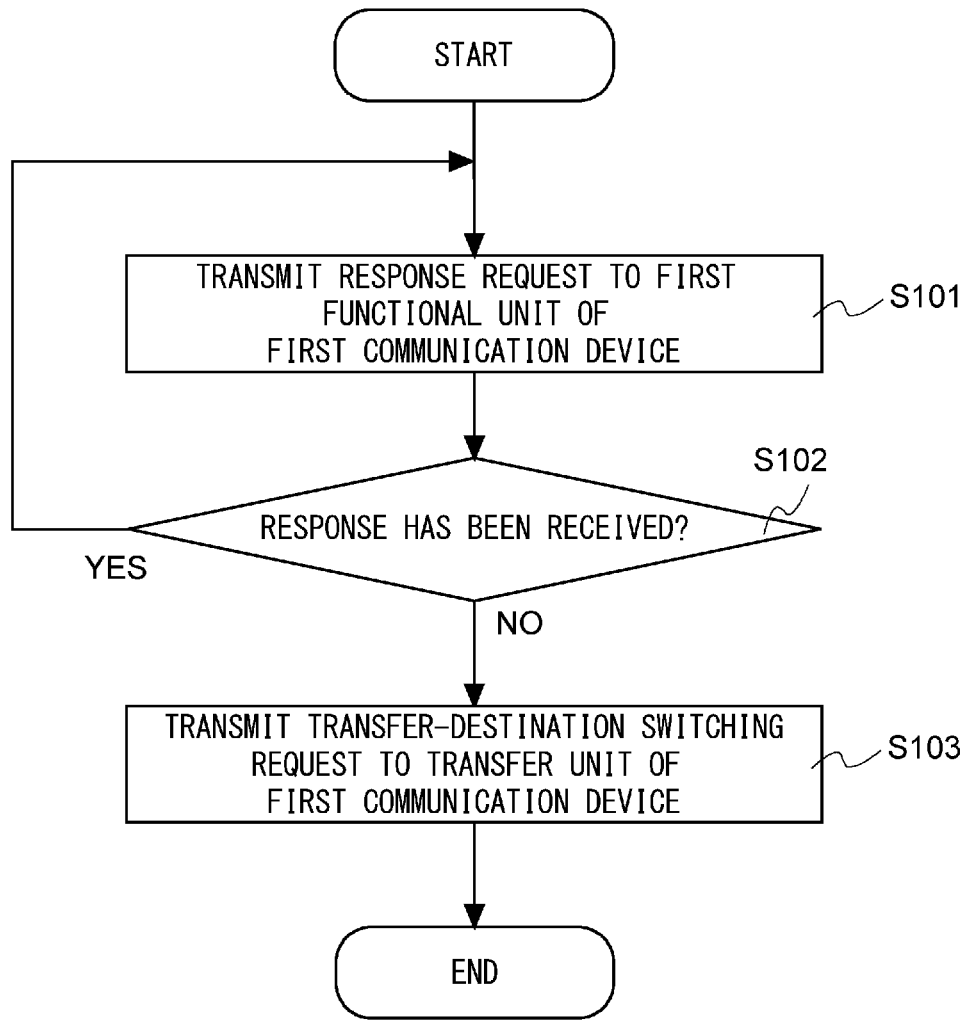
FIG. 5 is a flowchart showing a procedure to be executed by a second communication device that functions as a backup device.

FIG. 5 is a flowchart showing a procedure to be executed by each of the functional units of the second communication device 20 that functions as the backup device. In the following description, the functional units of the first communication device 10 that functions as the main device are first functional units, and the functional units of the second communication device 20 that functions as the backup device are second functional units.

In Step S101, one of the second functional units of the second communication device 20 transmits the response request to a corresponding one of the first functional units of the first communication device 10, the corresponding one of the first functional units corresponding to the one of the second functional units. The response request includes identification information of the response request, an IP address of the first communication device 10, i.e., a transmission destination of the response request, and identification information of the corresponding one of the first functional units. When the response request has been received from the second communication device 20, the packet transfer unit 131 of the transfer unit 130 of the first communication device 10 transfers the response request to the corresponding one of the first functional units, the corresponding one of the first functional units being indicated by the identification information of the corresponding one of the functional units. For example, in the example embodiment in which the functional-unit identification information shown in FIG. 8 is used, if the functional-unit identification information is "function_A," the packet transfer unit 131 transfers the packets to the functional unit 122 indicated by "function_A." If the functional-unit identification information is "function_B," the packet transfer unit 131 transfers the packets to the functional unit 123 indicated by "function_B." If the functional-unit identification information is "function_C," the packet transfer unit 131 transfers the packets to the functional unit 112 indicated by "function_C."

In Step S102, the one of the second functional units determines whether or not to have received the response from the corresponding one of the first functional units of the first communication device 10. If the one of the second functional units has received the response (YES), the procedure returns to Step S101. Meanwhile, if the one of the second functional units has not received the response (NO), the procedure branches to Step S103. In Step S103, the one of the second functional units transmits the transfer-destination switching request to the transfer unit 130 of the first communication device 10. Then, the procedure shown in FIG. 5 is ended. The transfer-destination switching request includes identification information of the transfer-destination switching request, and identification information of the one of the second functional units, i.e., the transmission origin of the transfer-destination switching request, that is, the identification information of the corresponding one of the first functional units, the identification information of the corresponding one of the first functional units corresponding to the identification information of the one of the second functional units. As will be described in detail with reference to FIG. 7, the transfer-destination switching unit 133 of the transfer unit 130 of the first communication device 10 updates the transfer-destination management table 134 so that the transfer destination of the packets that should be processed by the one of the second functional units is switched from the corresponding one of the first functional units to the one of the second functional units.

Figure 6:
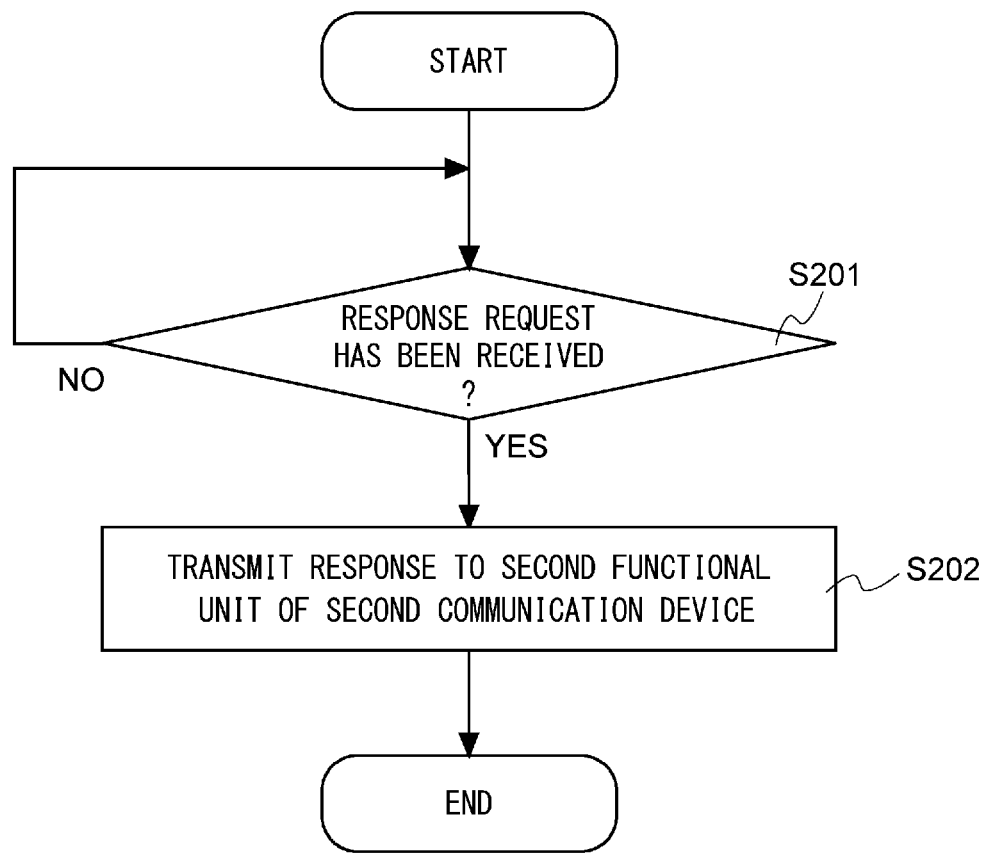
FIG. 6 is a flowchart showing a procedure to be executed by a first communication device that functions as a main device.

FIG. 6 is a flowchart showing a procedure to be executed by each of the functional units of the first communication device 10 that functions as the main device. In Step S201, the corresponding one of the first functional units of the first communication device 10 determines whether or not to have received the response request from the one of the second functional units of the second communication device 20 via the transfer unit 130, the one of the second functional units corresponding to the corresponding one of the first functional units. If the corresponding one of the first functional units has not received the response request (NO), the process of Step S201 is executed again. Meanwhile, if the corresponding one of the first functional units has received the response request (YES), the procedure branches to Step S202. In Step S202, the corresponding one of the first functional units transmits the response to the one of the second functional units of the second communication device 20, i.e., the transmission origin of the response request. Then, the procedure shown in FIG. 6 is ended.

Figure 7:
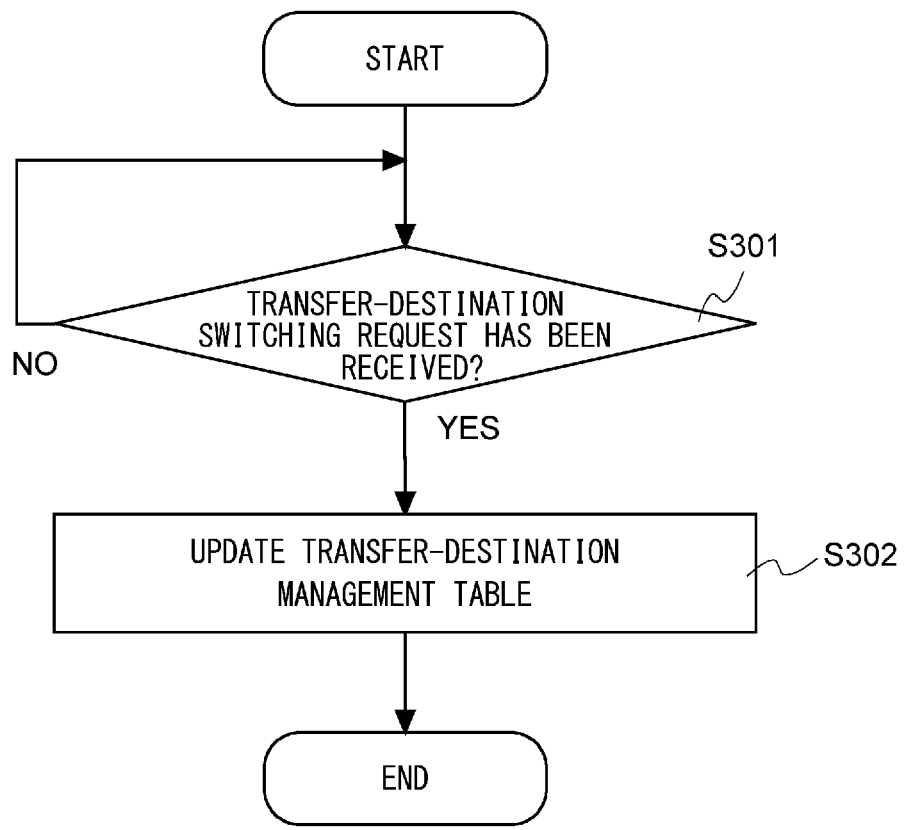
FIG. 7 is a flowchart showing another procedure to be executed by the first communication device that functions as the main device.

FIG. 7 is a flowchart showing a procedure to be executed by the transfer unit 130 of the first communication device 10 that functions as the main device. In Step S301, the monitoring unit 132 of the transfer unit 130 determines whether or not the transfer-destination switching request has been received from the second communication device 20. If the transfer-destination switching request has not been received (NO), the process of Step S301 is executed again. Meanwhile, if the transfer-destination switching request has been received (YES), the procedure branches to Step S302. In Step S302, the transfer-destination switching unit 133 of the transfer unit 130 updates the transfer-destination management table 134 so as to switch the transfer destination of the packets that should be processed by the one of the functional units of the transmission origin of the transfer-destination switching request to this one of the functional units. Then, the procedure shown in FIG. 7 is ended. Specifically, the transfer-destination switching unit 133 refers to the transfer-destination management table 134, and registers information, which indicates that the transfer-destination switching request has been made, in association with the identification information of the one of the functional units of the transmission origin of the transfer-destination switching request, the identification information being included in the transfer-destination switching request. By doing so, if the packets that should be processed by the one of the functional units of the transmission origin of the transfer-destination switching request are received, the packet transfer unit 131 transfers these packets to this one of the functional units.

In the above description of this example embodiment, the second functional units of the second communication device 20, i.e., the backup device, transmit response requests respectively to the corresponding first functional units. By doing so, keep-alive monitoring on each of the functional units is performed. Then, if there is no response to the response request, one of the second functional units causes the transfer unit 130 of the first communication device 10 to switch a transfer destination of packets that are supposed to be processed by a corresponding one of the first functional units to the one of the second functional units, the corresponding one of the first functional units having not transmitted the response. Subsequently, the one of the second functional units of the second communication device 20 processes the packets. By doing so, in case where a problem occurs only to a certain one functional unit of a plurality of functional units of a communication device, a function of this functional unit can be independently exerted by another communication device.

In addition, in the above description of this example embodiment, if the transfer-destination switching request has been received from the second communication device 20, the transfer-destination switching unit 133 of the first communication device 10 switches the transfer destination of the packets that are supposed to be processed by the corresponding one of the first functional units from the corresponding one of the first functional units to the one of the second functional units, the corresponding one having not transmitted the response. In addition, the transfer-destination switching unit 133 of the first communication device 10 does not switch transfer destinations of other packets. Thus, even in case where a problem occurs to a certain one of the functional units, other ones of the functional units, to which problems have not occurred, can continue to process the packets. In this way, data loss or temporary outage that may occur in switching the functional units that process the packets can be prevented.

In the above-described examples, the programs are stored by using non-transitory computer-readable media of various types, and can be provided to computers. The non-transitory computer-readable media encompass tangible storage media of various types. Examples of the non-transitory computer-readable media include magnetic storage media (such as a flexible disk, a magnetic tape, and a hard disk drive), magneto-optical storage media (such as a magneto-optical disk), a CD-ROM, a CD-R, a CD-R/W, and semiconductor memories (such as a mask ROM, a PROM (Programmable ROM), an EPROM (Erasable PROM), a flash ROM, and a RAM). In addition, the programs may be provided to the computers via transitory computer-readable media of various types. Examples of these transitory computer-readable media include an electrical signal, an optical signal, and an electromagnetic wave. These transitory computer-readable media are able to supply the programs to the computers through wired communication paths such as an electric wire and optical fiber or a wireless communication path.

The present invention is not limited to the foregoing example embodiment, and modifications may be made as appropriate within the gist of the present invention. For example, although the CPU 110 and the CPU 120 respectively implement the one functional unit and the two functional units in the above description of this example embodiment, each of the CPU 110 and the CPU 120 may implement an arbitrary number of functional units in another example embodiment. In addition, with regard to the functional unit that routes the packets and the functional units that execute the processes for the IP telephone in the above description of this example embodiment, the CPU 110 and the CPU 120 may implement functional units that execute various other processes than these processes (such as an application that performs WAN communication).

This application claims the benefit of Japanese Patent Application No. 2018-240552 filed on Dec. 25, 2018, the entire contents of which are incorporated herein by reference.

REFERENCE SIGNS LIST

10 FIRST COMMUNICATION DEVICE
20 SECOND COMMUNICATION DEVICE
30a TERMINAL DEVICE
30b TERMINAL DEVICE
40 INTERNET
50 COMMUNICATION SYSTEM

What is claimed is:

1. A communication system comprising:
a first communication device that includes a plurality of first computing devices, a plurality of first programs, and a transfer device, and that functions as a main device, wherein the plurality of first programs include a program for routing packets received from external devices, a program for controlling IP-telephone calls, and a program for controlling IP-telephone audio communication; and
a second communication device that includes a plurality of second computing devices and a plurality of second programs corresponding to the plurality of first programs, and that functions as a backup device for the first communication device, wherein the plurality of second programs include a program for routing the packets received from the external devices, a program for controlling the IP-telephone calls, and a program for controlling the IP-telephone audio communication, wherein
at least some programs of the plurality of first programs are implemented on one of the plurality of first computing devices of the first communication device,
other first programs of the plurality of first programs are implemented on other of the plurality of first computing devices of the first communication device,
at least some programs of the plurality of second programs are implemented on one of the plurality of second computing devices of the second communication device,
other second programs of the plurality of second programs are implemented on other of the plurality of second computing devices of the second communication device,
the plurality of second programs are each to:
transmit a response request to a corresponding first program, and determine whether or not a response to the response request has been received from the corresponding first program; and
transmit, to the transfer device, a transfer-destination switching request for transferring packets that are supposed to be processed by the corresponding first program to the second communication device if the response has not been received from the corresponding first program,
the plurality of first programs are each to:
determine whether or not the response request has been received from a corresponding second program; and
transmit a response to the response request to the corresponding second program—if the response request has been received from the corresponding second program—, and
the transfer device unit is configured to includes:
switch a transfer destination of the packets that are supposed to be processed by the first programs, the response of which has not been received, from the first computing device implementing the first programs—to the second communication device if the transfer-destination switching request has been received from the second programs; and
transfer the packets to the second communication device and transfer other packets to the first computing device implementing the first programs to process the other packets,
the second programs are each to process some packets transferred to the second communication device by the transfer device in the second computing device implementing the second program if the response has not been received.

2. The communication system according to claim 1, wherein if the transfer-destination switching request has been received from the second communication device, the transfer device of the first communication device does not switch transfer destinations of the other packets other than the packets that are supposed to be processed by the first programs, the response of which has not been received.

3. The communication system according to claim 2, wherein if the response has not been received from the first programs due to a problem that has occurred to at least one of the first programs, the second communication device transmits the transfer-destination switching request to the first communication device.

4. The communication system according to claim 1, wherein if the response has not been received from the first programs due to a problem that has occurred to at least one of the first programs, the second communication device transmits the transfer-destination switching request to the first communication device.

5. A communication device that functions as a backup device comprising:
a plurality of computing devices; and
a plurality of second programs corresponding to a plurality of first programs of another communication device, wherein the plurality of first programs and the plurality of second programs include a program for routing packets received from external devices, a program for controlling IP-telephone calls, and a program for controlling IP-telephone audio communication, wherein
at least some programs of the plurality of second programs are implemented on one of the plurality of computing devices of own the communication device,
other of the plurality of second programs are implemented on other of the plurality of computing devices of the communication device,
the plurality of second programs are each to:
transmit a response request to a corresponding first program of the another communication device, and determine whether or not a response to the response request has been received from the corresponding first program of the another communication device,
transmit, to the another communication device, a transfer-destination switching request for transferring packets that supposed to be processed by the corresponding first program of the another communication device to the communication device if the response has not been received from the corresponding first program, and
process, in the computing device implementing the second program, some packets transferred by the another communication device if the response has not been received.

6. The communication device according to claim 5, wherein if the response has not been received from the first program of the another communication device due to a problem that has occurred to the first program of the another communication device, the communication device transmits the transfer-destination switching request to the another communication device.

7. A communication device that functions as a main device comprising:
 a plurality of computing devices;
 a plurality of programs including a program for routing packets which are received from external devices, a program for controlling IP-telephone calls, and a program for controlling IP-telephone audio communication; and
a transfer device, wherein
 at least some programs of the plurality of programs are implemented on one of the plurality of computing devices of the communication device,
 other programs of the plurality of programs are implemented on other of the plurality of computing devices of the communication device,
 the plurality of programs are each to determine whether or not a response request has been received from a corresponding second program of another communication device, and transmit a response to the response request to the another communication device if the response request has been received from the corresponding second program of the another communication device,
 the transfer device is configured to:
  switch a transfer destination of packets that are supposed to be processed by the programs, the response of which has not been received, from the computing device implementing the programs to the another communication device if a transfer-destination switching request has been received from the another communication device; and
  transfer the packets to the another communication device and transfer other packets to the computing device implementing the programs to process the other packets.

8. The communication device according to claim 7, wherein if the transfer-destination switching request has been received from the another communication device, the transfer device does not switch transfer destinations of the other packets other than the packets that are supposed to be processed by the programs, the response of which has not been received.

* * * * *